Nov. 3, 1970   E. WENDEL   3,537,841
METHOD OF REDUCING IRON ORES TO PIG IRON
Filed Jan. 25, 1967

INVENTOR.
Eberhard Wendel
BY

United States Patent Office 3,537,841
Patented Nov. 3, 1970

3,537,841
METHOD OF REDUCING IRON ORES TO PIG IRON
Eberhard Wendel, 18 Nussbaumstr., 565 Solingen-Auf der Hohe, Germany
Filed Jan. 25, 1967, Ser. No. 611,624
Claims priority, application Germany, Oct. 21, 1966, W 42,632
Int. Cl. C21b 5/00
U.S. Cl. 75—42                                    10 Claims

ABSTRACT OF THE DISCLOSURE

A method of reducing iron ore to pig iron in a shaft furnace, which includes the steps of: introducing an excess quantity of carbon into the furnace portion above the bath of molten pig iron, and additionally introducing an excess quantity of carbon into the pig iron melt which in said furnace surrounds the lower portion of the iron skeleton in said furnace.

---

The present invention relates to a method of reducing iron ores to pig iron in shaft furnaces with the introduction of an excess quantity of carbon into the hearth above the bath.

A method of the above mentioned type has become known according to which two chronologically succeeding method steps are provided, namely a heating and melting of the charge on one hand and a reduction of the molten ore on the other hand. With this method, an excess in oxygen is introduced into the lower shaft portion and by means of said oxygen excess, an oxidizing atmosphere is created. The reducing carbon is introduced into the liquid metal melt below the slag, whereas the fuel together with the oxygen is introduced above the slag layer.

There has furthermore become known a reduction method according to which a mixture of air and coal dust is blown into the hearth above the bath of the melt, and this mixture is supposed to produce a reducing atmosphere in the lower shaft portion.

According to still another heretofore known method, heated air and carbon are so introduced that a melting flame is produced by means of which the melting of the charge in the lower portion of the shaft is to be effected. It is also known to blow carbon dust containing air clouds into the interior of the furnace.

For directly producing iron from iron ore, it is also known to introduce the ore under a heat supply together with slag forming admixtures or flux in a continuous manner onto the surface of a carbon enriched iron melt which by means of said carbon is reduced to iron while the carbon used up during the said reduction is replaced by the introduction of pulverous carbon, oil or an emulsion of oil and pulverous carbon. The carbon, the oil, or the emulsion of oil and carbon are in the form of a jet with high kinetic energy blown onto the reduction melt in such a way that the ore and slag cover is broken and the carbon, the oil or the emulsion of oil and carbon penetrates the melt. This method is a hearth type furnace method. The advantage of this method is seen in the fact that by blowing the reduction medium onto the surface of the melt, a vivid movement of the bath is created by means of which the course of the reduction will be accelerated. With this method, the introduced carbon acts as reducing and carbon enriching medium while only a direct reduction of the liquid iron oxide to iron takes place, but not an indirect reduction.

Finally, there has become known a method of making iron and steel which has the purpose of increasing the degree of purity of the material. According to this method, an iron skeleton is in the lower portion of the furnace, which latter works similar to a Siemens-Martin furnace, melted at steel melting temperature.

It is an object of the present invention to improve the heretofore known methods of reducing ore.

It is another object of this invention to provide a method of reducing ore which will be considerably more economical than heretofore known methods with regard to the consumption of fuel.

It is still another object of this invention to provide a method as set forth in the preceding paragraphs, which is simple and can be practiced at relatively low cost.

These and other objects and advantages of the invention will appear more clearly from the following specification in connection with the accompanying drawing, in which.

Figure 1:
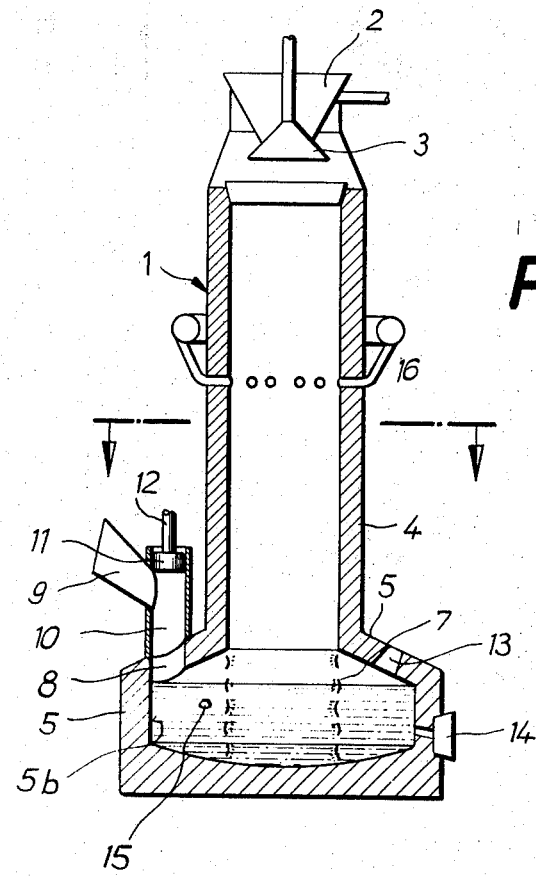
FIG. 1 is a vertical section through a shaft furnace for carrying out the method according to the present invention.

The method for reducing iron ores to pig iron in a shaft furnace with the introduction of an excess quantity of carbon into the hearth above the bath is, in conformity with the present invention, characterized in that an excess quantity of carbon is additionally introduced into the pig iron melt formed in the hearth and surrounding the iron skeleton bottom portion. In this connection, in contrast to heretofore known methods, it is important that the bottom portion of the iron skeleton stands in the pig iron bath which latter melts the iron skeleton while saving fuel. This melting is effected in such a way that in the hearth, the excess quantity of carbon is introduced into the pig iron bath. As a result thereof, a continuous exchange effect between the pig iron melt and the added excess carbon and the iron skeleton takes place.

The excess quantity of carbon is partially dissolved as a result of which the melting of the iron skeleton bottom portion takes place at temperatures of from 1150 to 1250° C. This is in clear contrast to the heretofore known reduction and melting methods which operate at temperatures of from 1500 to 1600° C. by means of heated air and the addition of fuel. The melting of the iron skeleton thus takes place at a temperature which is approximately 350° C. lower than with heretofore known methods which in turn brings about a considerable reduction in the required quantity of fuel.

In contrast to the above last mentioned heretofore known method, the melting of the iron skeleton in conformity with the present invention is effected in the melt and at temperatures which are considerably below the steel melting temperature.

The method according to the invention may also be realized in such a way that the carbon monoxide and, as the case may be, hydrogen containing gas is burned in the upper portion of the shaft in a manner known per se by adding air or oxygen.

According to a further development of the present invention, up to five times the quantity by volume of ore in a mass of slag or slag forming material may be added to the charge of slag. The addition of slag when producing iron from iron ores is generally known and this broad idea is not claimed in the present case as novel per se. On the other hand, with the method according to the present invention, the addition of slag or slag forming substances has proved particularly advantageous inasmuch as it prevents a sticking of the charge, especially in the lower section of the shaft furnace. A slag skeleton is created which results in an increased gas permeability. By melting out the slag, a faster melting of the iron skeleton will be obtained. In addition to the slag, heated up oxygen containing gas may be blown into the lower section of the shaft furnace or into the hearth. The slag may be added at the time when the ore is charged. The slag itself may consist of internal circulating slag, and the increased quantity of slag may be withdrawn through a slag opening.

Referring now to the drawing in detail, the charge consisting of ore and possibly slag forming additions or flux is introduced into the shaft furnace 1 through a hopper 2 with a closure cone 3 and passes into the shaft 4. A melting of the charge does not yet take place in shaft 4. Only in the hearth 5 which has a broadened cross section with regard to the shaft 4, is a melt of liquid pig iron formed on which the slag layer rests. The iron skeleton 7 rests in the melt of the hearth 5 and is in a continuous way melted to pig iron.

The carbon which during this process serves for carbon enrichment and reduction of the remainder is introduced into the melt through openings 8 which are arranged along a circle at the top side 5a of the hearth 5. To this end, the carbon is through a lateral hopper or feeding opening 9 introduced into a filling pipe 10 and by means of a piston 11 is pressed into the melt, the piston being depressed by fluid pressure means of any standard design (not shown) through the intervention of a piston rod 12. The piston will move only to the lower portion of the filling pipe 10 which in a manner known per se is equipped with cooling devices. The filling pipe 10 as well as the funnel 9 may be equipped with closure means of any standard type.

With the arrangement of the filling pipe, it is advantageous to locate the same at the vertical side wall 5b of the hearth so that a bridge formation through the filled-in carbon, which first rests on the slag layer, will not take place.

By pushing down the carbon into the melt, the carbon is pressed in the direction toward the iron skeleton.

The required heat is produced by burners which are introduced through openings 13 in upper wall 5a of the hearth 5 and in which gaseous, liquid or pulverous fuel can be burned. With electro furnaces, the heat may be produced also partially by electrodes which extend into the hearth.

The pig iron is withdrawn through opening 14, whereas the slag is withdrawn through an opening 15.

The carbon monoxide gases which form in the hearth 5 and, as the case may be, also the hydrogen gases rise in the shaft 4 where they reduce a portion of the oxides and form an iron skeleton in the charge. After the said carbon monoxide and, as the case may be, hydrogen gases have served their purpose, they may together with air introduced through conduits 16 be completely burned, and the produced heat may be employed for preheating the charge.

The indirect reduction in shaft 4 has, in addition to the formation of the iron skeleton in the shaft, the further advantage that the indirect reduction in shaft 4 reduces the heat requirement of the process because for the reduced direct reduction in the hearth 5 there will a smaller quantity of carbon and less heat be required than would be the case in the absence of the indirect reduction.

The burners introduced in the hearth 5 through openings 14 are intended to work with a reducing flame in order to assure a reducing atmosphere in the hearth. The combustion air can be preheated or can be partially or entirely be replaced by oxygen.

Figure 2:
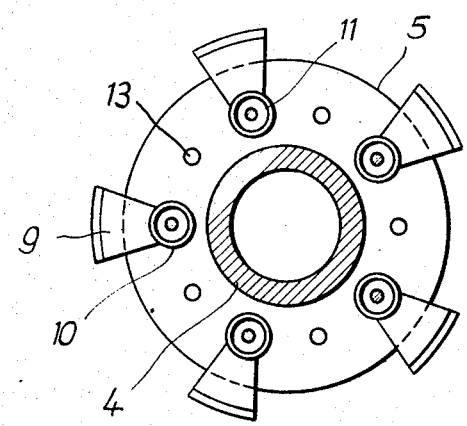
FIG. 2 is a section taken along the line II—II of FIG. 1.

Due to the fact that the burners and the carbon adding devices alternate at the outer margin of the hearth 5, as is particularly clearly shown in FIG. 2, the carbon will prior to its contact with the metal and slag bath, be preheated, and furthermore the production of a reducing carbon oxide containing atmosphere in the hearth will be assured.

EXAMPLE

There will now be set forth an example for producing a metric ton of pig iron in conformity with the present invention:

1410 kg. Fe-ore with 68% Fe: 1% $SiO_2$; 0.5% $Al_2O_3$; grain size ½ to 1″.

33.7 kg. of additions with 90% CaO; 2% $SiO_2$; 1% $Al_2O_3$.

800 kg. circulating slag with 37% $SiO_2$; 37% CaO; 19% $Al_2O_3$; remainder FeO; MnO; MgO; S, etc.

The above quantities are introduced through the hopper 2.

60 kg. of lumpy coke with 90% C; 5% $SiO_2$; 2.5% $Al_2O_3$.

This lumpy coke is pressed into the bath; the coke dust is fired over the burner.

235 kg. coke dust is fed to the burners.

The quantity of methane ($CH_4$) fed to the burners amounts to 145 $Nm.^3$ (normal cubic meters).

If instead of coke dust, coal dust is used, the carbon content of the employed quantity of coal dust must correspond to the carbon content of the quantity of coke dust, but the quantity of methane gas may be reduced in view of the volatile components of the coal dust.

The temperature of the blast should be 1000° C., the quantity of the blast should be 1400 $Nm.^3$.

When enriching the blast or air with $O_2$, the circulating quantity of slag may be reduced in conformity with the reduction in the N-load. As a result thereof, the required heat and thus the fuel consumption will be reduced. In view of the enrichment of the air with $O_2$ the pre-heating temperature of the blast can be reduced.

It is, of course, to be understood that the present invention is, by no means, limited to the particular methods set forth herein, but also comprises any modifications within the scope of the appended claims.

Thus, while the preceding specification refers to the reduction of iron ores to pig iron, the invention is equally applicable to the reduction of metals melted in a shaft furnace, with which metals a reduction of the ore is possible.

What I claim is:

1. A method of reducing iron ores to pig iron in a shaft-type energy input furnace with a hearth in which a bath of molten pig iron forms a pig iron melt around an iron skeleton continuously melted into pig iron, which includes the steps of: introducing an excess quantity of solid carbonaceous material into the hearth of the furnace above the bath of molten pig iron, and in combination additionally introducing an excess quantity of solid carbonaceous material pressed directly into the pig iron melt to lower the melting point of the iron skeleton particularly in the lower portion thereof to approximately 1150–1250° C., thus reducing required energy input into the furnace.

2. A method according to claim 1, which includes the step of introducing air into the gaseous atmosphere effectively in the upper portion of said shaft-type furnace.

3. A method according to claim 1, which includes the step of introducing oxygen into the gaseous atmosphere effectively in the upper portion of said shaft-type furnace.

4. A method according to claim 1, which includes the step of adding slag to the charge of ore particularly in a range up to five times the quantity by volume of ore in a mass of slag.

5. A method according to claim 1, which includes the step of adding slag-forming material to the charge of ore particularly in a range up to five times the quantity by volume of ore in a mass of slag-forming material.

6. A method according to claim 4, which includes the step of employing broken internal circulating slag for avoiding ore charge sticking especially in the lower portion of the furnace with increased gas permeabiility.

7. A method according to claim 4, which includes withdrawing the increased quantity of slag through a slag opening in a manner concurrently during said adding of slag and accompanying circulation of slag.

8. A method according to claim 1, which includes the step of blowing heated-up oxygen containing gas directly into the lower section of the furnace.

9. A method according to claim 1, which includes the step of blowing heated-up oxygen containing gas directly into the hearth adjoining the shaft of said furnace.

10. A method according to claim 1, which includes the step of maintaining the temperature value in the furnace shaft sufficiently to prevent a melting of the charge introduced from above in said furnace shaft.

References Cited

UNITED STATES PATENTS

| | | | |
|---|---|---|---|
| 2,727,815 | 12/1955 | Kjellman | 75—30 |
| 3,236,628 | 2/1966 | Von Bogdandy | 75—40 |

RICHARD O. DEAN, Primary Examiner

U.S. Cl. X.R.

75—24, 30